June 15, 1954 H. E. ROYS 2,681,387

MAGNETIC RECORD REPRODUCING SYSTEM

Filed Feb. 10, 1950

Inventor
Henry E. Roys
By
[signature]
Attorney

Patented June 15, 1954

2,681,387

UNITED STATES PATENT OFFICE 2,681,387

MAGNETIC RECORD REPRODUCING SYSTEM

Henry E. Roys, Haddon Heights, N. J., assignor to Radio Corporation of America, a corporation of Delaware Application February 10, 1950, Serial No. 143,385

7 Claims. (Cl. 179—100.2)

Figure 1:
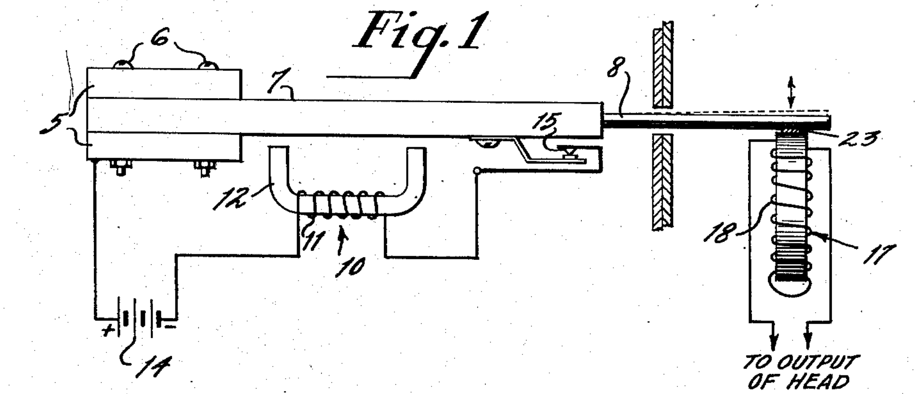

This invention relates to the art of transcribing magnetically recorded signals, and particularly to an improvement upon the system disclosed and claimed by Arthur C. Canfora in copending application, Ser. No. 46,948, filed August 31, 1948.

It has heretofore been proposed to record high-speed telegraph signals upon a rapidly moving magnetic record, and subsequently, to translate or reproduce the recorded signals into an intelligible message by running the record at a much lower speed through a reproducing machine or phonograph. Canfora, in his above-identified disclosure, points out that in the usual magnetic phonograph the voltage induced in the pick-up device is a function of the change in flux linkage between the signal bearing record and the pick-up per unit of time, and that this fact has heretofore imposed a lower limit, such as two feet per second, upon the play-back speed. Canfora appreciated that if the change in flux linkage per unit of time could be increased without increasing the speed of the record, the voltage induced in the pick-up device would be increased, or, considered from another aspect, a satisfactorily high voltage could be established in the pick-up device, while running the record at a much slower speed, e. g., a few inches per second. To this end, Canfora provides a pick-up magnet having one stationary and one hinged pole piece, and, by imparting movement to the latter, continuously alters the dimension of the gap between the pole pieces, while running the record across the gap at the indicated low speed. Thus, the flux linkage between the record and the pick-up magnet is a function not only of the movement of the record with respect to the magnet, but also of the described continuous variation in the dimensions of the non-magnetic gap.

I have now discovered that the desired increase in flux linkage, and its attendant results, i. e., an increase in the signal voltage induced in the pick-up device, and/or lower record speed, can be achieved in a machine employing a conventional pick-up magnet, such as one having stationary polar extremities, by subjecting the magnetic tape or other record directly to the action of the vibratile element, such as a vibrating reed, mounted in the path of movement of the record adjacent to the non-magnetic gap in the pick-up device.

The principal object of the invention, therefore, is to facilitate the reproduction of magnetically recorded signals.

Another object of the invention is to provide an improved system of reproducing the signals recorded on a magnetic record medium at a relatively slow rate of speed.

A further object of the invention is to provide an improved system for increasing the flux linkage per unit of time between a magnetic pick-up unit and the magnets in a magnetic record medium.

Figure 2:
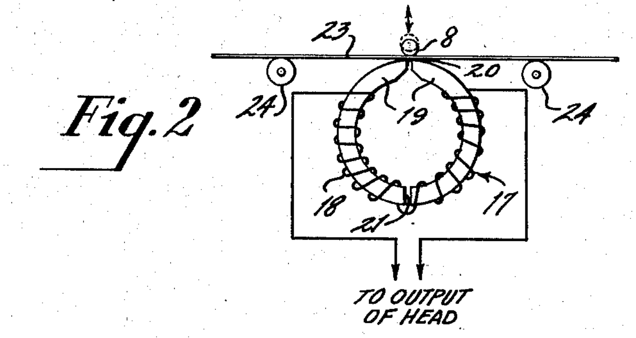
Figure 3:
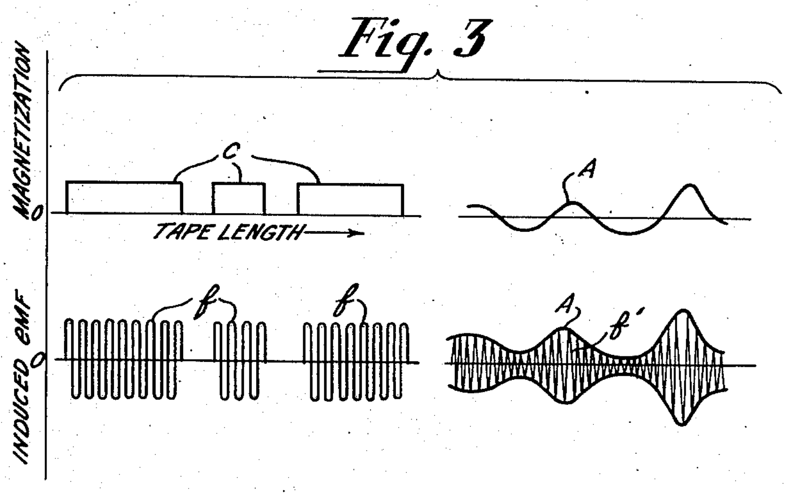

Although the novel features which are believed to be characteristic of this invention will be pointed out with particularity in the appended claims, the manner of its organization and the mode of its operation will be better understood by referring to the following description, read in conjunction with the accompanying drawings, forming a part hereof, in which the single sheet of drawings comprises:

Fig. 1, which is a side elevation, and Fig. 2, which is a front elevation of a telegraphone pick-up device, including a magnet and a vibratile element mounted in accordance with my invention in a position to impart its vibrations to the telegraphone record, and Fig. 3, which is a chart, similar to the one shown in the Canfora application, showing the effect of the vibratory movement of the record upon the reproduction of direct current, such as "code" and audio frequency, e. g., "voice" signals from the telegraphone record.

Referring now to the drawings, a clamp 5 having bolts 6 holds one end of a reed 7, the other end of which is attached to a non-magnetic rod 8. The reed 7 and rod 8 are vibrated by an electromagnetic vibrator 10 having a coil 11 and a core 12, the coil being energized by a battery 14 when contact 15 is made, and de-energized when contact 15 is broken, which action is well-known in the art. The reed 7 will vibrate at a rate dependent upon its proportions and resiliency.

A standard form of magnetic record reproducing head is shown at 17 with a winding 18 and a sectionalized core 19 having a reproducing gap 20 and a rear gap 21. This head has stationary polar extremities which define the fixed boundaries of the gap 20. A magnetic record medium, such as a tape or film 23, is advanced past gap 20 by means not shown, rollers 24 guiding the record medium. The terminals of the winding 18 are connected to an amplifier, detector, and reproducer for making audible, or visible, if desired, the voltage variations induced in the winding 18. A magnetic shield for the head composed of layers of copper and mu-metal is positioned adjacent the head 17 and between the vibrator and head.

As shown in Fig. 1, the tape 23 passes gap 20 in contact with the end of rod 8 and as the rod 8 is vibrated, the tape moves toward and away from the gap in a plane in which the gap is located at the rate of vibration of the rod. Should the tape be magnetized at any point, the voltage induced in the winding 18, at the time the magnetized point is adjacent the gap has an amplitude proportional to the magnetic intensity in the tape and a fixed frequency determined by the constant rate of vibration of the reed 7, which may be high because of the relatively small amount of mass to be vibrated. This movement of the magnetized point at right angles to the gap, in addition to the normal movement of the point past the gap, increases the rate of change of flux in winding 18 and results in a higher voltage being induced therein than would be induced by the normal passing of the tape over the gap 20. As pointed out in the Canfora application, above-identified, this permits very low tape or film speeds to be employed to obtain a relatively high output signal.

In code transmission, the signals may be recorded at a high rate of tape speed to obtain the necessary separation between pulses, and reproduced at a slow rate. For these direct current impulses, the reed may vibrate the tape at an amplitude of one-eighth of an inch at a frequency of around one thousand cycles, which would be pleasing to an operator. For audio signals, the amplitude of vibration should be lower and at a higher frequency. In audio signal recording, both the recording and reproduction may be at a much slower rate of tape speed than is possible without the production of the additional flux variation.

To illustrate, reference is made to Fig. 3, wherein a telegraph or code signal is represented by a group of one short and two long dashes C, and an audio frequency signal is represented by magnetic variation A. As these variations in magnetism pass gap 20, the voltage induced in the winding 18 by C is shown at $f$, and the voltage induced by A is shown at $f'$, the envelope of $f'$ representing A. After detection, the envelope A is reproduced.

The invention is applicable to the editing of magnetic sound film, whereby the signals are recorded at ninety feet per minute, corresponding to thirty-five millimeter motion picture speed; but, any point of which may be reproduced with sufficient intelligibility to make identification possible, by moving the tape by hand between the rod 8 and gap 20. In this manner, the location of a phrase, and particularly a break between words or phrases, or a noise point may be readily made during the cutting or editing of the various sequences making up a motion picture sound track.

I claim:

1. In a telegraphone, the combination of a magnetic record, a magnetic transducer having stationary polar extremities defining the fixed boundaries of a non-magnetic gap disposed adjacent to the path of movement of said magnetic record, and means including a vibratile element mounted adjacent to and within the flux field of said gap of said transducer produced by said record and in a position to impart vibrations to said record during its movement along that portion of said path adjacent to and within the flux field of said gap produced by said record to induce in said transducer a carrier current for said record.

2. In a telegraphone, the combination of a magnetic record, a pick-up magnet having stationary polar extremities defining the fixed boundaries of a non-magnetic gap disposed adjacent to the path of movement of said magnetic record, and means including a vibratile element mounted adjacent to said magnet with a portion thereof at said gap and in a position to impart vibrations of said record toward and away from said gap during its movement along that portion of said path which lies adjacent to said gap to induce in said transducer a carrier current for said record.

3. In a magnetic sound reproducing system, the combination of a magnetic record medium having a signal thereon, a magnet having stationary polar extremities defining fixed boundaries of a non-magnetic gap, means for moving said record across said gap, windings on said magnet, and a vibratile element mounted in a position to vibrate said record toward and away from said gap during the movement of said record to induce in said windings a carrier current for said signal being reproduced across said gap.

4. A magnetic phonograph of the type wherein a signal-bearing magnetic record is moved at substantially constant linear speed across the non-magnetic gap of a stationary magnetic pick-up device, whereby a voltage corresponding to the flux linkage per unit of time is induced in said pick-up device from said moving magnetic record, comprising a core having a gap therein, means for advancing said record past said gap, means including a vibratile element disposed adjacent to said gap in said core and in a position to vibrate the portion of said record which lies adjacent said gap during the advancement of said record across said gap to generate a carrier current by varying the amplitude of said voltage by varying the flux linkage per unit of time between said record and said pick-up device, and means for actuating said vibratile element.

5. A magnetic variation detecting device comprising a core having a gap therein, a winding on said core, a vibratile element adjacent said gap, a magnetic record medium having variations in magnetism therein, means for advancing said record between said element and said gap in contact with said element, and means for vibrating said vibratile element to induce in said winding a carrier current for the signal on said medium.

6. A magnetic variation detecting device in accordance with claim 5, in which said vibratile element is a reed vibrated to and from said gap in a plane containing said gap.

7. A magnetic variation detecting device in accordance with claim 5, in which said vibratile element is a reed having an end thereof adjacent said gap and said last mentioned means is an electro-magnet to which the other end of said reed is attached.

References Cited in the file of this patent

UNITED STATES PATENTS

| Number | Name | Date |
|---|---|---|
| 2,423,339 | Newman | July 1, 1947 |
| 2,587,593 | Camras | Mar. 4, 1952 |

FOREIGN PATENTS

| Number | Country | Date |
|---|---|---|
| 236,050 | Switzerland | Jan. 15, 1945 |